United States Patent [19]

Veltman

[11] Patent Number: 5,215,002
[45] Date of Patent: Jun. 1, 1993

[54] SINGLE VESSEL ROTARY PROCESSOR
[75] Inventor: Joost Veltman, Santa Cruz, Calif.
[73] Assignee: FMC Corporation, Chicago, Ill.
[21] Appl. No.: 835,881
[22] Filed: Feb. 14, 1992
[51] Int. Cl.$^5$ .............................................. A23L 3/06
[52] U.S. Cl. ........................................ 99/361; 99/365; 99/370; 134/132; 422/292; 422/307
[58] Field of Search .............. 99/361, 365, 367, 368, 99/370; 422/292, 307; 134/65, 132

[56] References Cited

U.S. PATENT DOCUMENTS

| Re. 17,643 | 4/1930 | Thompson | 99/361 |
| 1,491,093 | 4/1924 | Fooks | 99/361 |
| 1,510,544 | 10/1924 | Chapman | 99/361 |
| 1,754,532 | 4/1930 | Thompson | 99/361 |
| 1,901,083 | 3/1933 | Chapman | 99/365 |
| 2,092,434 | 9/1937 | Thompson | 99/361 |
| 2,536,116 | 1/1951 | Wilbur | 99/370 |

*Primary Examiner*—Harvey C. Hornsby
*Assistant Examiner*—Mark Spisich
*Attorney, Agent, or Firm*—Michael Lee; R. C. Kamp; R. B. Megley

[57] ABSTRACT

The invention provides a rotary processor which is able to both cook and cool containerized food in a single vessel. The rotary processor comprises a single vessel with a rotatable reel, which has barrier walls disposed within the reel. The barrier walls allow one side of the vessel to heat and another side of the vessel to cool.

15 Claims, 2 Drawing Sheets

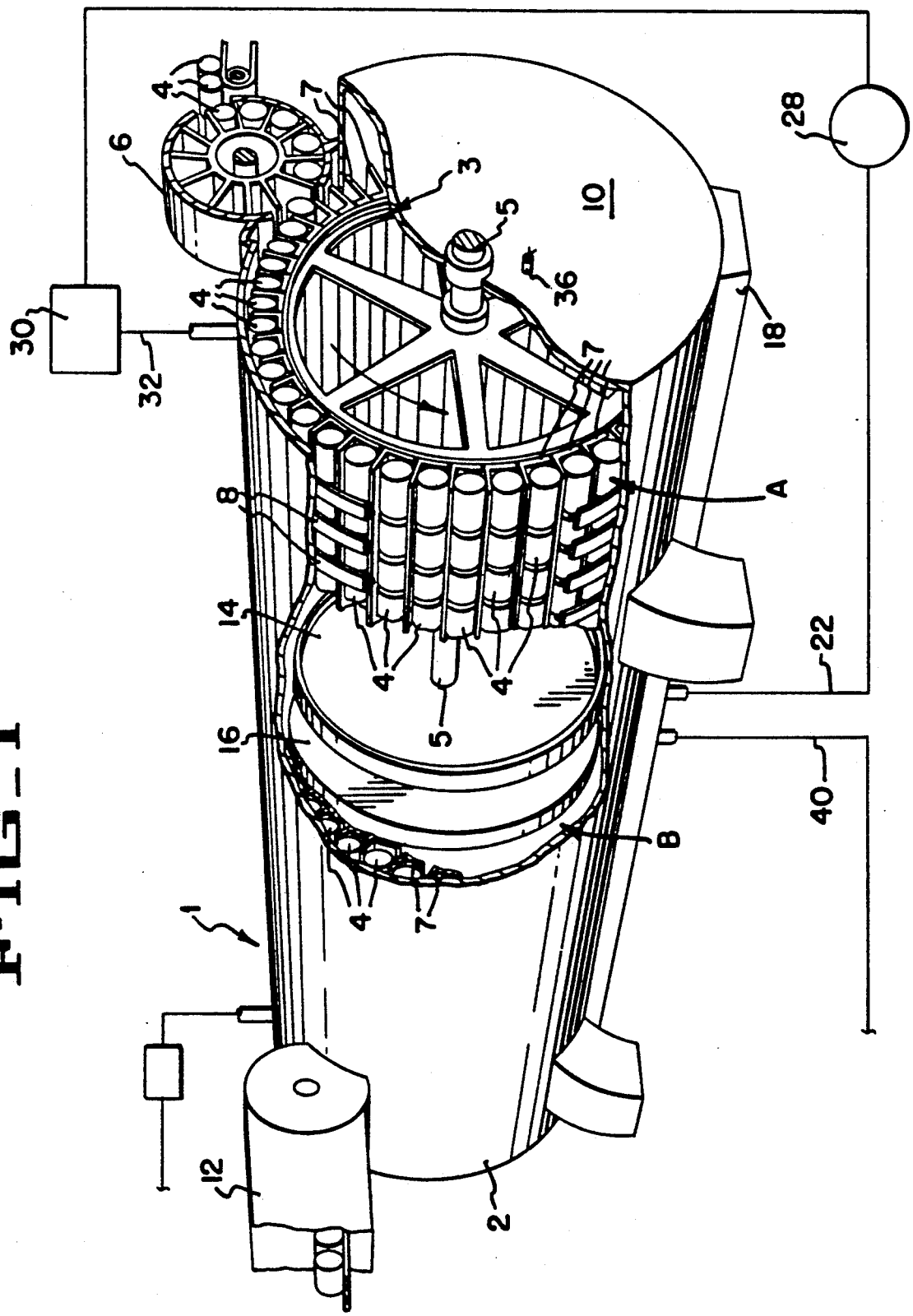
FIG_1

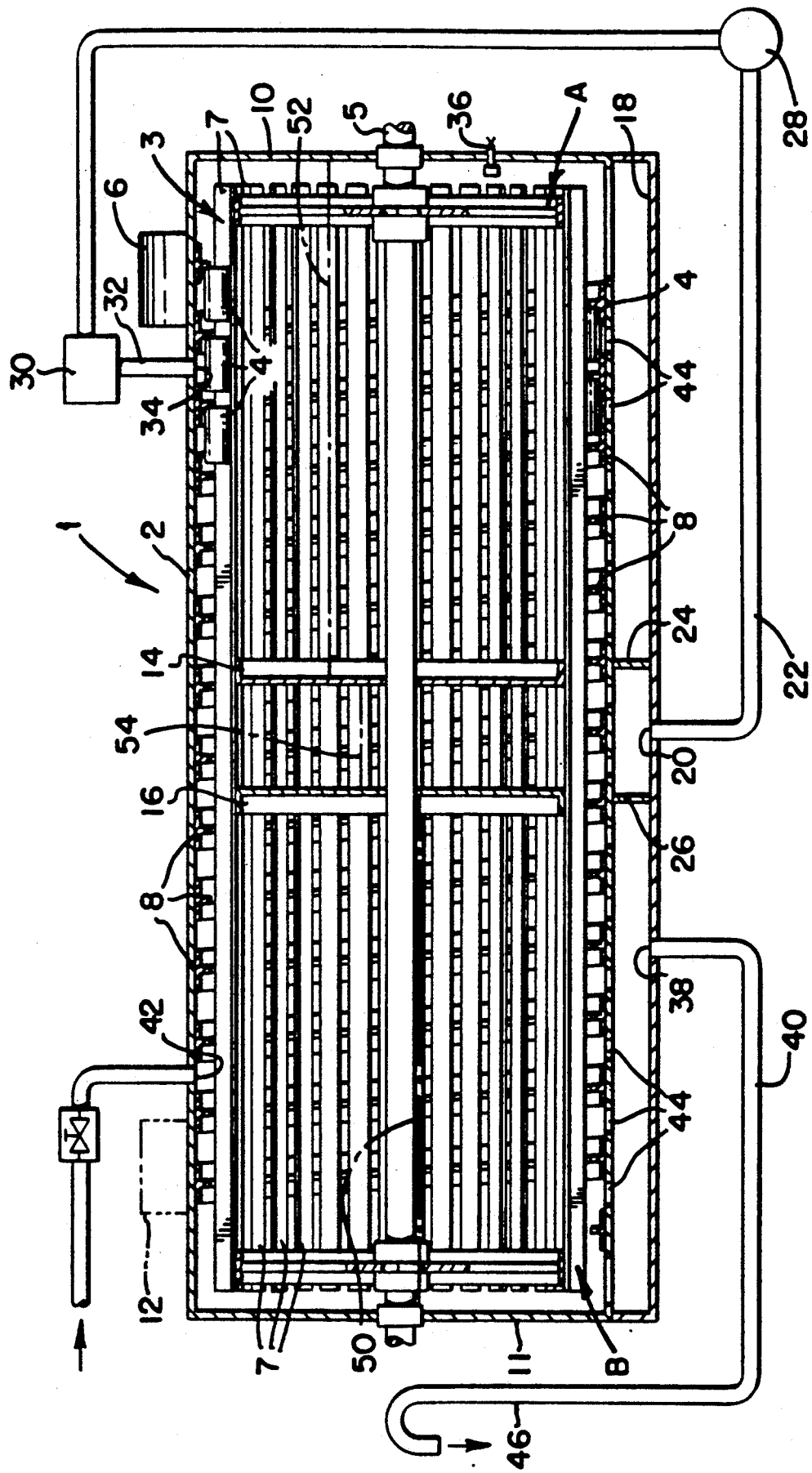

SINGLE VESSEL ROTARY PROCESSOR

In continuous, rotary pressure sterilizers for containerized foods, at least one vessel (or shell) is used for heating filled containers and a separate vessel is used for cooling the filled containers.

It is an object of the invention to provide a rotary sterilizer or cooker which heats to cook or sterilize and cools in a single vessel.

Another object of the invention is to provide rotary sterilizer or cooker with a minimal footprint.

The invention provides a rotary apparatus, in which a single vessel has barriers which separate a heating region from a cooling region, and a pump, which pumps fluid from the area around the barriers to a region to provide a dynamic barrier.

FIG. 1 is a perspective view with parts cut away of a single vessel reel spiral heating and cooling processor.

FIG. 2 is a cross sectional view of the processor in FIG. 1 along lines 2—2.

FIG. 1 is a perspective view of a single vessel reel spiral heating and cooling processor used in an embodiment of the invention. FIG. 2 is a cross sectional view of the processor in FIG. 1 along lines 2—2. The single vessel spiral heating and cooling processor includes a cylindrical housing 2 having a rotatable reel 3 therein, which rotates around an axle 5 which is journaled in a first end plate 10 and a second end plate 11 that are secured to the housing 2 in pressure tight engagement. The cylindrical housing 2 and the end plates 10, 11 form a single vessel 1. On a first end of the vessel 1 in the region of the first end plate 10 is a feed device 6. On a second side of the vessel 1 in the region of the second end plate 11 is a discharge device 12. A plurality of angle bars 7 extend the length of the reel 3 parallel to the axis of rotation of the reel 3 on the outer circumference of the reel 3. A T-shaped rail 8 forms a spiral on the inside of the housing 2. Between the first end and the second end of the vessel 1 is a first barrier wall 14, which in this embodiment forms a first region A between the first barrier wall 14 and the first end plate 10, and a second barrier wall 16, which in this embodiment forms a second region B between the second barrier wall 16 and the second end plate 11, wherein the first barrier wall 14 and the second barrier wall 16 extend across a cross section of the rotatable reel 3 wherein the cross section is substantially perpendicular to the length of the reel 3. At the bottom of the vessel 1 is a trough 18.

Placed in the trough 18 is a first baffle 24 below the first barrier wall 14 and a second baffle 26 below the second barrier wall 16. Between the first baffle 24 and the second baffle 26 in the trough 18 is a first fluid drain 20, so that the first fluid drain is below and between the first barrier wall 14 and the second barrier wall 16. The first fluid drain 20 is connected to a first drain tube 22 which is connected to a first pump 28 which is able to remove fluid from the first fluid drain 20 between the first and second baffles 24, 26 and direct it to a fluid heater 30. The fluid heater is connected to a fluid return line 32, which is connected to a first fluid inlet 34 in the first region A of the vessel 1. A second fluid drain 38 is located between the second baffle 26 and the second end plate 11. The second fluid drain 38 is connected to a second fluid drain tube 40, which is connected to a cooling water level control device 46, such as a goose neck tube. A second fluid inlet 42 is located in the second region B of the vessel. A series of ports 44 allows fluid to flow from the upper part of the vessel 1 to the trough 18.

In operation of the above embodiment of the invention, cool water at a temperature less than 50° C. is provided through the second fluid inlet 42. Water from the second inlet 42 is drained through the second fluid drain 38 and the first fluid drain 20. The water that is drained through the first fluid drain 20 is pumped by the pump 28 to the fluid heater 30. The fluid heater 30 combines the water with steam, heating the water to a desired temperature, which in this embodiment is above 90° C. After the fluid heater 30 heats the water to the desired temperature, the heated water is introduced into the first region A of the vessel 1 through the first fluid inlet 34. The water provided through the first fluid inlet 34 is drained through the first fluid drain 20 and the second fluid drain 38. Since water drained through the first fluid drain 20 is provided to the first fluid inlet 34, the hydrostatic pressure in the first region A of the vessel 1 becomes higher than the hydrostatic pressure in the second region B of the vessel 1 and a dynamic equilibrium is established, where most of the water flowing through the first fluid drain 20 is from the first fluid inlet 34. The difference in hydrostatic pressure is also manifested by the difference in the first region A water level 50, the second region B water level 52, and the barrier region water level 54, as illustrated in FIG. 2. In this dynamic equilibrium, heat energy is lost from the first region A to the second region B through fluid flowing through the space between the outer side of the rotatable reel 3 and the housing 2. Once the fluid heats the first region A to a desired temperature, cans 4 are introduced by the feed device 6 into the first region A of the vessel 1. As the cans 4 fill the vessel as shown in FIG. 1, the dynamic equilibrium changes in several ways. The cans 4 may slightly change the temperatures in the vessel 1 due to the difference in heat capacity between the water and the cans 4. This change in temperature will be sensed by a temperature probe 36 in the fluids in vessel 1 and corrected by the fluid heater 30. The cans 4 will also cause a displacement of some of the water. More importantly, cans 4 will fill some of the space between the rotatable reel 3 and the housing 2 diminishing the loss of heat energy and fluids from the first region A to the second region B. The fluid level control device 46 allows the maintenance of the water level in the second region B of the vessel 1 at a desired height, with excess water being drained from the second fluid drain through the fluid level control device 46.

An individual can is provided to the feed device 6, which provides the can to the rotatable reel 3 in the vessel 1. An angle iron 7 on the rotatable reel 3 pushes the can 4 around the rotatable reel 3 in a counter clockwise direction as indicated by the arrow. As the can 4 rotates around the rotatable reel 3, the T-shaped spiral rail pushes the can from near to first end plate 10 towards the second end plate 11. While in the first region A of the vessel 1 the can is heated so that the contents are agitated and sterilized or cooked by the heat provided from the heated water. When the can 4 is near the bottom portion of the vessel 1 near the trough the can rolls against the bottom portion of the vessel 1 causing agitation of the contents in the can 4. When the can reaches the region between the rotatable reel 3 and the housing 2 adjacent to the first barrier wall 14 and the second barrier wall 16, the can 4 helps to provide a baffle to diminish the amount of heat lost from the first region A to the second region B of the vessel 1. When the can 4 enters the second region B of the vessel 1 the can is cooled by water from the second fluid inlet 42. After the can 4 is sufficiently cooled, it is removed from the vessel 1 by a discharge device 12.

The above method and apparatus may be modified to provide more than two different processing regions by using more barrier walls in a single vessel. For a small change in temperature between regions a single barrier wall may be desirable. For a greater temperature or pressure difference, more than two barrier walls and/or pumps may be desired. Pressurized steam may also be used. Other fluids may be used in place of water. The cooling water may be sprayed into the area above the water level or may flow directly to the body of water in the second region of the vessel. The first barrier wall and the second barrier wall may be sealed together to form a hollow region.

The above invention may be added to conventional spiral rotary cooker sterilizer systems which use double spirals for two lines of cans, or which may handle bottles, plastic containers or other containers, and which use conventional control systems. The invention may provide more than two stages in a single vessel or use an additional vessel for further processing.

While preferred embodiment of the present invention has been shown and described herein, it will be appreciated that various changes and modifications may be made therein without departing from the spirit of the invention as defined by the scope of the appended claims.

What is claimed is:

1. An apparatus for processing filled containers using a fluid, comprising:
    a vessel with a central cavity with a first end and a second end and a top and a bottom;
    an axle with a length extending from the first end of the central cavity to the second end of the central cavity;
    a reel connected to and extending along the length of the axle wherein the reel has outer edges, which are parts of the reel displaced furthest from the axle, wherein the outer edges of the reel are able to rotate around the axle within the central cavity;
    means connected to the outer edges of the reel and extending along the length of the reel for pushing the containers around the reel as the reel is rotated;
    a spiral piece on the inside of the central cavity around the reel;
    a first barrier wall filling an area between the outer edges of the reel, wherein the first barrier wall has a first side and a second side
    a first fluid drain for draining fluid on the first side of the first barrier wall from the vessel;
    first temperature control means connected to the first fluid drain for maintaining the fluid drained by the first fluid drain to a first temperature; and
    first fluid inlet connected to the first temperature control means for providing fluid from the first temperature control means into the vessel on the first side of the first barrier wall.

2. An apparatus, as claimed in claim 1, further comprising:
    a second fluid drain for draining fluid on the second side of the first barrier wall from the vessel; and
    a second fluid inlet for providing fluid into the vessel on the second side of the first barrier wall.

3. An apparatus, as claimed in claim 2, further comprising, a second barrier wall filling an area between the outer edges of the reel and located on the first side of the first barrier wall.

4. An apparatus, as claimed in claim 3, wherein the bottom of the central cavity forms a trough, further comprising:
    a first baffle located in the trough below the first barrier wall; and
    a second baffle located in the trough below the second barrier wall, wherein the first fluid drain is located in the trough between the first baffle and second baffle.

5. An apparatus, as claimed in claim 4, further comprising means for allowing the second fluid drain to drain fluid only when the level of fluid on the second side of the first barrier wall is above a desired height.

6. An apparatus, as claimed in claim 5, further comprising:
    means for introducing containers of material into the vessel; and
    means for removing containers of material out of the vessel.

7. An apparatus, as claimed in claim 6, wherein the fluid is water and wherein the first temperature is above 90° C. and wherein the second fluid inlet provides water at a temperature below 50° C.

8. An apparatus, as claimed in claim 2, wherein the bottom of the central cavity forms a trough, further comprising, a first baffle located in the trough below the first barrier wall.

9. An apparatus, as claimed in claim 8, wherein the fluid is water and wherein the first temperature is above 90° C. and wherein the second fluid inlet provides water at a temperature below 50° C.

10. An apparatus for processing filled containers using a fluid, comprising:
    a vessel with a central cavity with a first end and a second end and a top and a bottom;
    an axle with a length extending from the first end of the central cavity to the second end of the central cavity;
    a reel connected to and extending along the length of the axle wherein the reel has outer edges, which are parts of the reel displaced furthest from the axle, wherein the outer edges of the reel are able to rotate around the axle within the central cavity;
    means connected to the outer edges of the reel and extending along the length of the reel for pushing the containers around the reel as the reel is rotated;
    a spiral piece on the inside of the central cavity around the reel;
    a first barrier wall filling an area between the outer edges of the reel, wherein the first barrier wall has a first side and a second side, wherein the area filled by the first barrier wall is a cross section of the reel, wherein the cross section is substantially perpendicular to the length of the reel;
    a first fluid drain for draining fluid on the first side of the first barrier wall from the vessel;
    first temperature control means connected to the first fluid drain for maintaining the fluid drained by the first fluid drain to a first temperature; and
    first fluid inlet connected to the first temperature control means for providing fluid from the first temperature control means into the vessel on the first side of the first barrier wall.

11. An apparatus, as claimed in claim 10, further comprising:

a second fluid drain for draining fluid on the second side of the first barrier wall from the vessel; and a second fluid inlet for providing fluid into the vessel on the second side of the first barrier wall.

12. An apparatus, as claimed in claim 11, further comprising, a second barrier wall filling an area between the outer edges of the reel and located on the first side of the first barrier wall, wherein the area filled by the second barrier wall is a cross section of the reel, wherein the cross section is substantially perpendicular to the length of the reel.

13. An apparatus, as claimed in claim 12, wherein the bottom of the central cavity forms a trough, further comprising:

a first baffle located in the trough below the first barrier wall; and a second baffle located in the trough below the second barrier wall, wherein the first fluid drain is located in the trough between the first baffle and second baffle.

14. An apparatus, as claimed in claim 13, further comprising:

means for introducing containers of material into the vessel; and means for removing containers of material out of the vessel.

15. An apparatus, as claimed in claim 14, wherein the fluid is water and wherein the first temperature is above 90° C. and wherein the second fluid inlet provides water at a temperature below 50° C.

* * * * *